(12) United States Patent
Glimcher et al.

(10) Patent No.: US 11,115,490 B2
(45) Date of Patent: Sep. 7, 2021

(54) HOST BASED READ CACHE FOR SAN SUPPORTING NVMEF WITH E2E VALIDATION

(71) Applicant: EMC IP Holding Company LLC, Hopkinton, MA (US)

(72) Inventors: Boris Glimcher, Bnei Brak (IL); Zvi Schneider, Tel Aviv (IL); Amitai Alkalay, Kadima (IL); Kirill Shoikhet, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 16/050,474

(22) Filed: Jul. 31, 2018

(65) Prior Publication Data
US 2020/0045125 A1 Feb. 6, 2020

(51) Int. Cl.
*H04L 29/08* (2006.01)
*G06F 3/06* (2006.01)
*H04L 9/32* (2006.01)

(52) U.S. Cl.
CPC .......... *H04L 67/2842* (2013.01); *G06F 3/061* (2013.01); *G06F 3/067* (2013.01); *G06F 3/0659* (2013.01); *H04L 9/3239* (2013.01)

(58) Field of Classification Search
CPC . H04L 67/2842; H04L 9/3239; H04L 63/123; H04L 67/1097; G06F 3/0659; G06F 3/067; G06F 3/061; G06F 3/0607; G06F 3/0688
See application file for complete search history.

(56) References Cited

U.S. PATENT DOCUMENTS

| | | | |
|---|---|---|---|
| 6,678,828 B1* | 1/2004 | Pham | G06F 3/0622 726/2 |
| 10,185,624 B2* | 1/2019 | Akutsu | G06F 3/067 |
| 2007/0156842 A1* | 7/2007 | Vermeulen | H04L 29/06047 709/217 |
| 2013/0297894 A1* | 11/2013 | Cohen | G06F 3/0679 711/154 |
| 2016/0054931 A1* | 2/2016 | Romanovsky | G06F 3/0608 711/103 |
| 2017/0230459 A1* | 8/2017 | Lin | G06F 3/0605 |
| 2018/0253386 A1* | 9/2018 | Qiu | G06F 13/1668 |
| 2018/0300082 A1* | 10/2018 | Furlong | G06F 3/0652 |
| 2018/0307650 A1* | 10/2018 | Kachare | G06F 16/24569 |
| 2019/0087115 A1* | 3/2019 | Li | G06F 16/137 |
| 2019/0116246 A1* | 4/2019 | Pfister | G06F 3/067 |
| 2019/0121889 A1* | 4/2019 | Gold | G06F 16/2255 |
| 2019/0354302 A1* | 11/2019 | Enz | H04L 67/1097 |

* cited by examiner

*Primary Examiner* — Charles Rones
*Assistant Examiner* — Tong B. Vo
(74) *Attorney, Agent, or Firm* — Daly, Crowley, Mofford & Durkee, LLP

(57) ABSTRACT

A method for performing host based read cache for storage area networks (SANs) supporting Non-Volatile Memory Express over Fabrics (NVMeF) with validation. The method includes upon a first read operation from a client system of a storage array, receiving metadata with a read response regarding location of data subject to the read operation. The method also includes performing, by the client system, direct NVMeF reads from a namespace offset from the metadata. The direct NVMeF reads bypass a software stack of the storage array. The method further includes upon receiving a data block at the client system, using a signature from the metadata to perform validation on the data.

18 Claims, 10 Drawing Sheets

HOST BASED READ CACHE FOR SAN SUPPORTING NVMEF WITH E2E VALIDATION

BACKGROUND

Storage systems provide content-based deduplicated data storage in which data block addresses may be generated from data content. As the costs of solid-state memory decrease, organizations can consider using systems that can store and process terabytes of data.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for implementing host-based read cache for SAN supporting non-volatile memory express (NVMeF) with E2E validation. The method includes upon a first read operation from a client system of a storage array, receiving metadata with a read response regarding location of data subject to the read operation. The method also includes performing, by the client system, direct NVMeF reads from a namespace offset from the metadata. The direct NVMeF reads bypass a software stack of the storage array. The method further includes upon receiving a data block at the client system, using a signature from the metadata to perform validation on the data.

Another aspect may provide a system for implementing host-based read cache for SAN supporting NVMeF with E2E validation in a storage system. The system includes a memory having computer-executable instructions and a processor. The processor executes the computer-executable instructions. When executed by the processor, the computer-executable instructions cause the processor to perform operations. The operations include upon a first read operation from a client system of a storage array, receiving metadata with a read response regarding location of data subject to the read operation. The operations also include performing, by the client system, direct NVMeF reads from a namespace offset from the metadata. The direct NVMeF reads bypass a software stack of the storage array. The operations further include upon receiving a data block at the client system, using a signature from the metadata to perform validation on the data.

Another aspect may provide a computer program product embodied on a non-transitory computer readable medium. The computer program product includes instructions that, when executed by a computer, causes the computer to perform operations. The operations include upon a first read operation from a client system of a storage array, receiving metadata with a read response regarding location of data subject to the read operation. The operations also include performing, by the client system, direct NVMeF reads from a namespace offset from the metadata. The direct NVMeF reads bypass a software stack of the storage array. The operations further include upon receiving a data block at the client system, using a signature from the metadata to perform validation on the data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
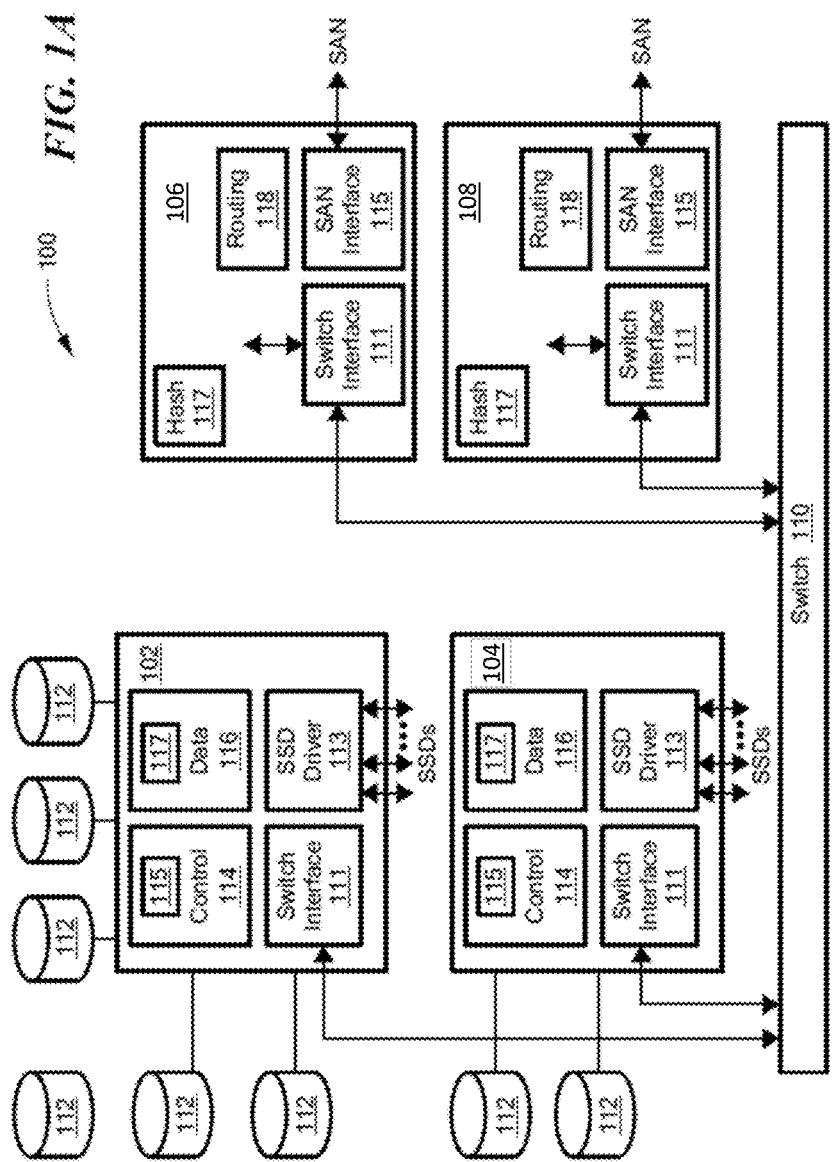
FIG. 1A is a block diagram of a content-based storage system having multi-level cache for deduplicated storage.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request" or simply "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, NVMeF (Non-Volatile Memory Express over Fabrics) is a communication protocol that enables a computer to access block-level storage devices attached to another computer via remote direct memory access over a number of transport protocols, such as fibre channel, TCP/IP, or Infiniband.

In certain embodiments, a software stack refers to a group of programs that work in tandem to produce a result or a set of applications that work in a defined order toward a common goal.

In certain embodiments, RDMA (remote direct memory access) is a direct memory access from the memory of one computer into that of another without involving either computer's operating system.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 117 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 108.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 can include a C cache 115 and the data modules 116 can include a D cache 117. As explained more fully below, the C cache 115 can include addresses, address hashes, and physical data location information and the D cache 117 can include, for each bucket, a filter, a hash to address, and bucket information.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
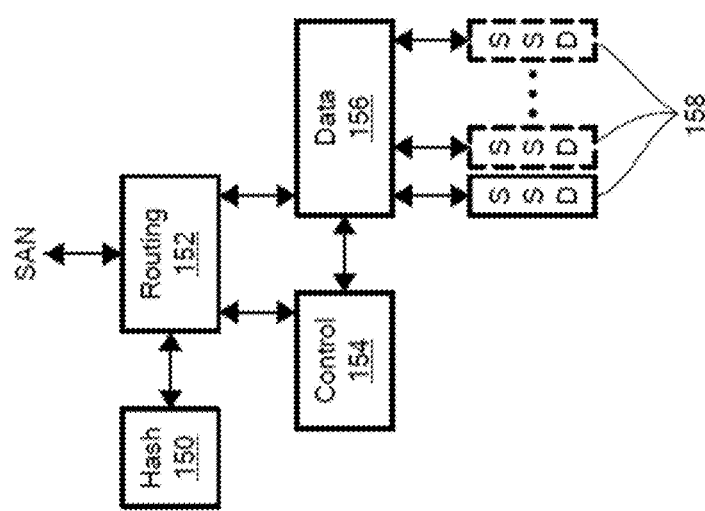
FIG. 1B illustrates further detail of the system of FIG. 1A.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
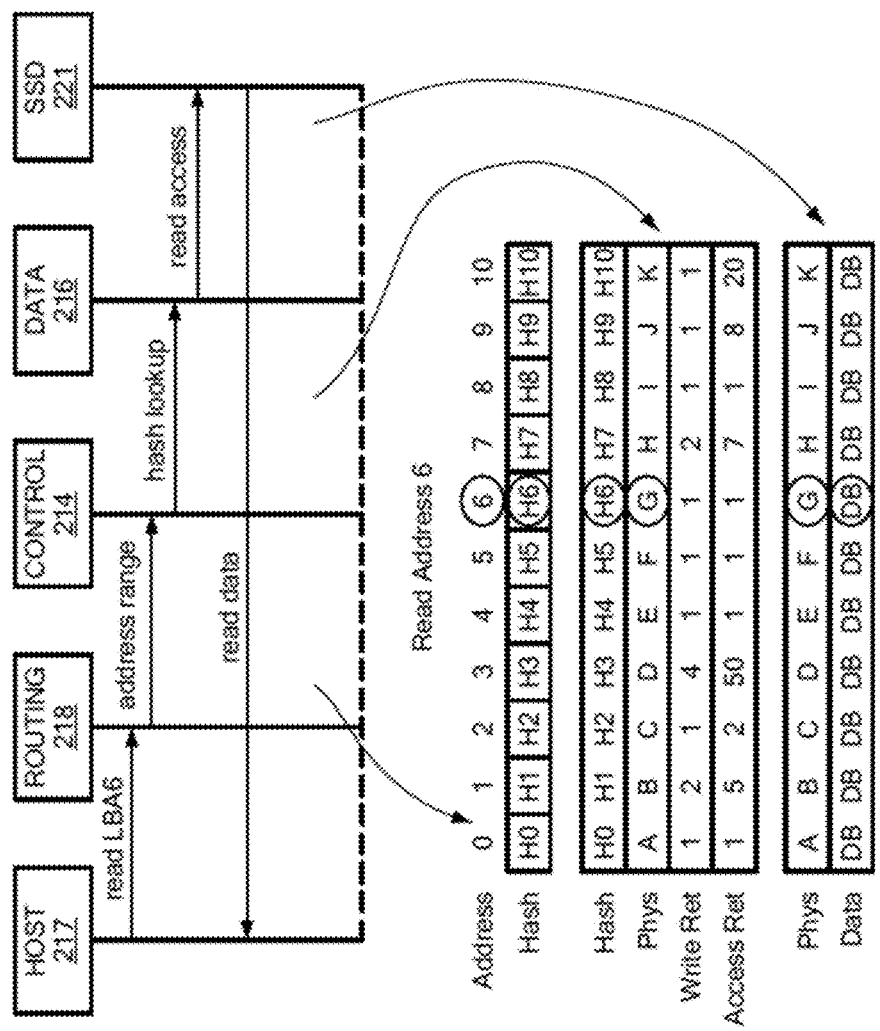
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
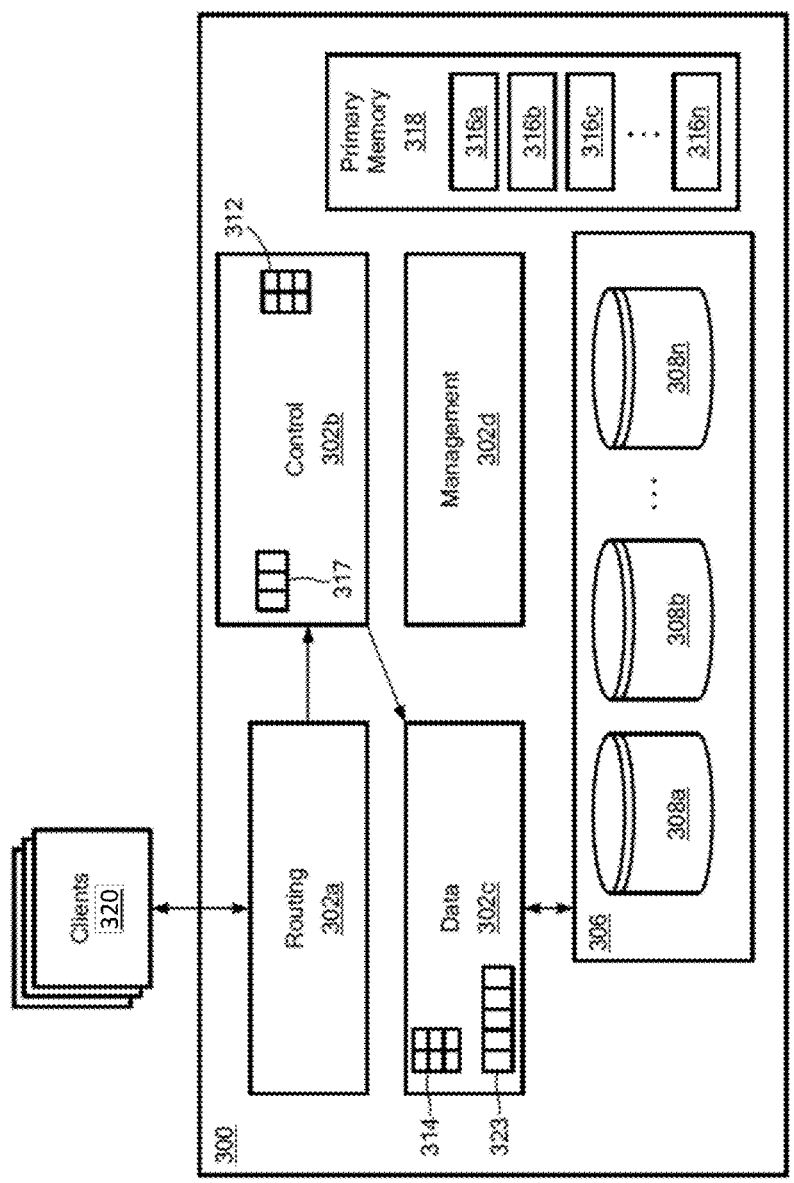
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A-H table) according to some embodiments. In one embodiment, I/O addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H-+P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, meta data can include for each address the hash value of the content. If the basis for deduplication is 16 KB, then the meta data holds for each address the short hash value of the data to which the address points. In cases where access to the volume is in larger chunks than the size of the basic hash value, the meta data for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the meta data of the hash from the disk to verify if such a hash exists. It will be appreciated that meta data structures may consume most of system memory, e.g., DRAM, in the storage system, so that the meta data limits the total size of the storage system.

Figure 4:
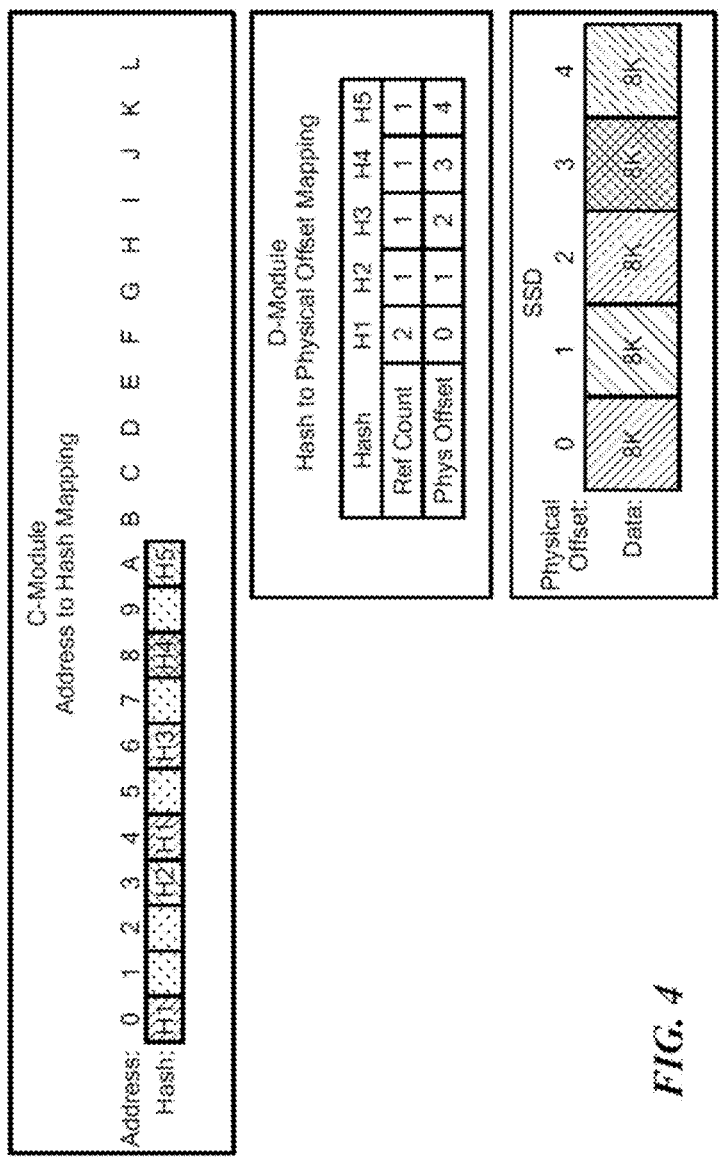
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

Modern storage systems, such as XtremeIO leverage flash drives to provide fast reliable de-duplicated storage. One of the challenges in storage systems is lack of fast native integration with third party external providers, e.g., storage area networks that use the storage system. The embodiments described herein provide a way to improve third-party integration with storage arrays by using shared NVMeF/RoCE (RDMA over a converged ethernet) Fabric and bypassing the heavy software stack of the storage array during read operations.

As described above, in a content aware storage system over a cluster of distributed servers, inside the cluster there are two layers for accessing the data: a first layer translates each address to the hash value of the data, and the second layer and the second layer translates the hash value to a physical location on the disk. In XtremIO, an R module parses SCSI commands, the C module holds the A2H table, and D module holds the H2P table.

Each time the client of the storage array issues a read request it will be handled by the R module. The address will be translated to a hash, and the hash will be translated to a physical location on the drive. Data will be read from the drive into RAM by the D-module. Then the data will be sent to the R module in order to reply to a user request. If a user reads the same data over and over again, it will not benefit from previous knowledge of its location thereby causing cache mechanisms using this strategy to become inefficient.

Caching solutions are limited to the amount of resources the storage array may provide (typically an amount of RAM). Thus, they are unable to scale efficiently and may result in cache trashing in some applications. In addition, each time a user reads data, it will go via the entire software stack (e.g., double translation and data copy) of the data. This can increase latency for read operations in a significant manner.

Embodiments described herein provide a new protocol using NVMeF that learns the metadata portion of the data from inside the storage array one time and then bypasses the storage array software stack completely while accessing the data. The embodiments utilize a "friendly zone," as follows:

Client servers in a friendly zone share the same RDMA/NVMeF fabric; and

Client servers in a friendly zone are aware of the data location on the drives.

This new protocol from the client servers in the friendly zone is referred to as "bypass read" or "direct read" or "metadata cache read" operations.

Figure 5A:
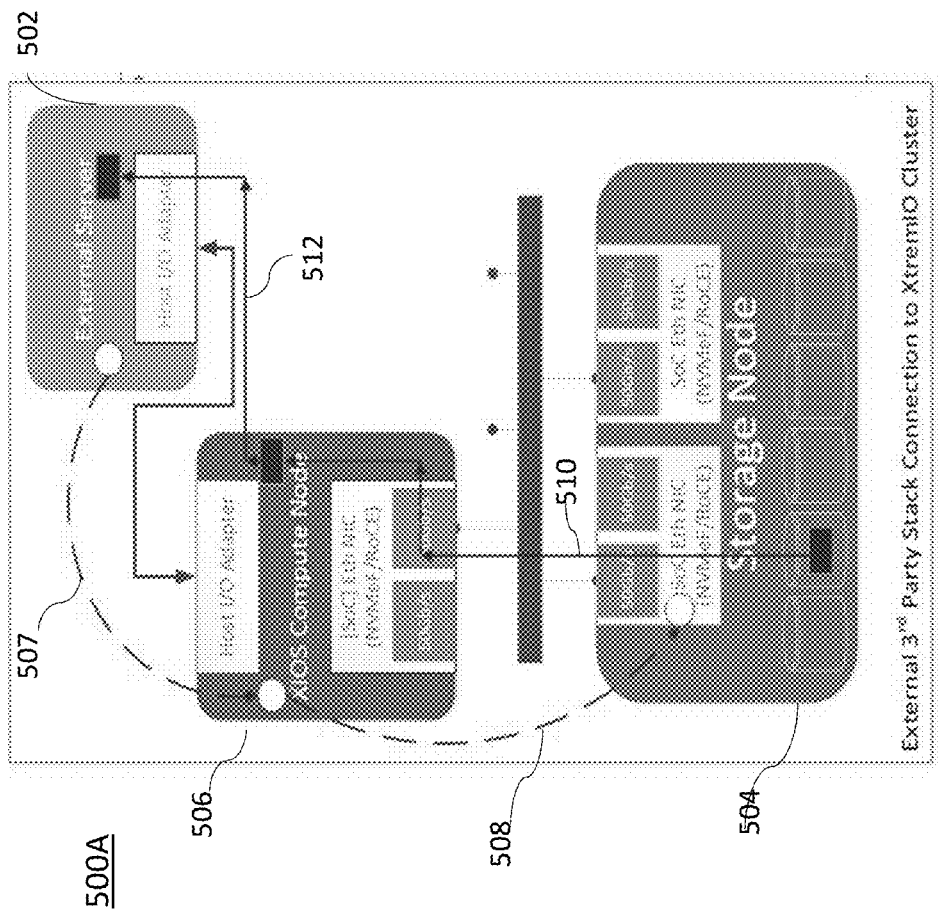
FIG. 5A is a diagram depicting an external third party stack connection to a storage cluster.
Figure 5B:
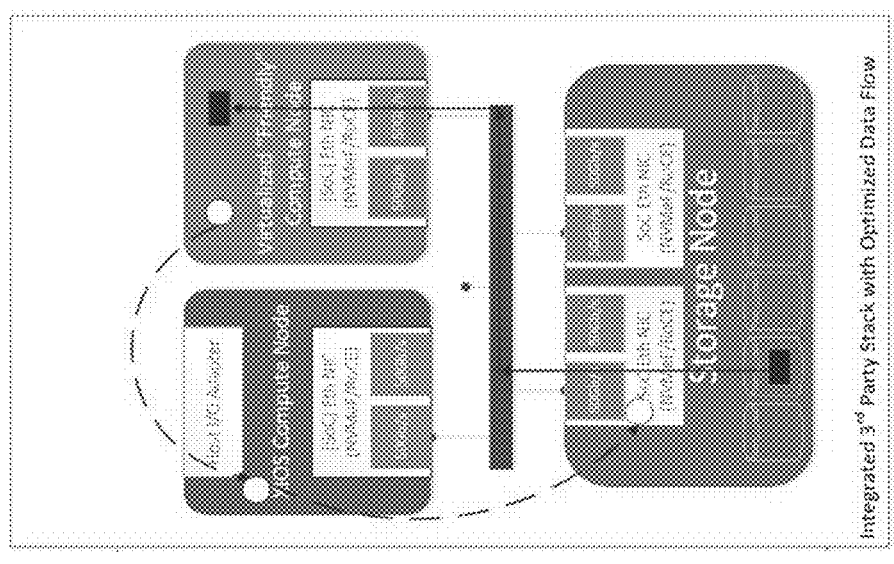
FIG. 5B is a diagram depicting an integrated third party stack with optimized data flow.
Figure 5C:
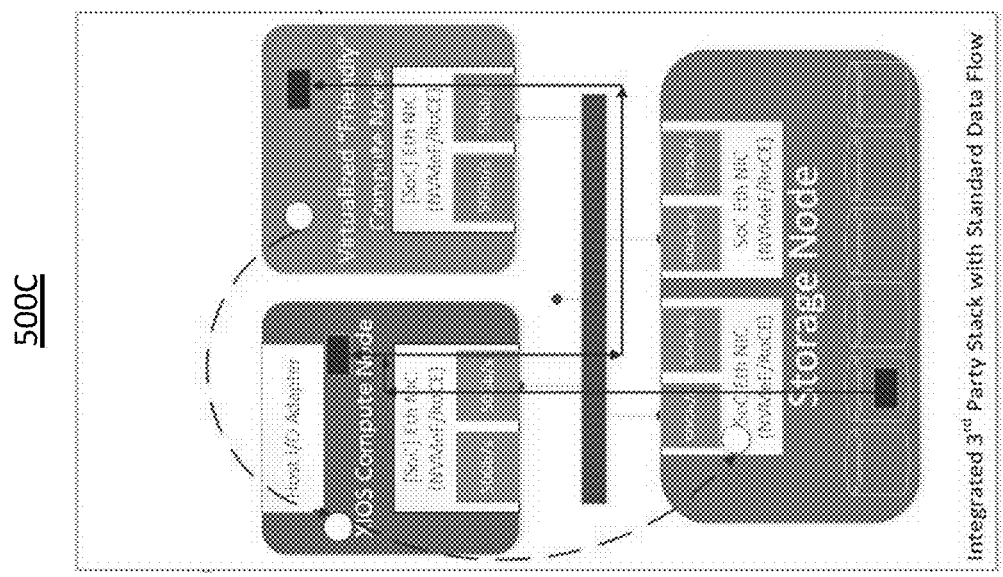
FIG. 5C is a diagram depicting an integrated third party stack with standard data flow.

FIG. 5A depicts an external third party stack connection to XtremIO cluster. The figure illustrates an existing double translation and double copy of the data. FIG. 5B depicts an integrated third party stack with optimized data flow. The figure illustrates single data fast read over fabric. FIG. 5C depicts an integrated third party stack with standard data flow. The figure illustrates a mitigation proposal between FIGS. 5A and 5B.

FIG. 5A illustrates how hosts (external servers) 502 are currently connected to a SAN array 504. A host issues a read operation 507 to a compute node 506. The compute node 506 then issues a read operation 508 the storage node 504. The storage node 504 reads the data and RDMA writes it 510 to the compute node 506, which sends it 512 to the host 520.

In FIG. 5C, which is similar to FIG. 5A, except hosts are connected to the SAN backend fabric instead of the frontend host 10 adapter. Read operations are still going from the storage node to the compute node to the host, just through a different connectivity.

In the embodiments described herein, as illustrated in FIG. 5B, the host is connected to the backend fabric but can read straight from the storage node NVME drives.

Figure 6:
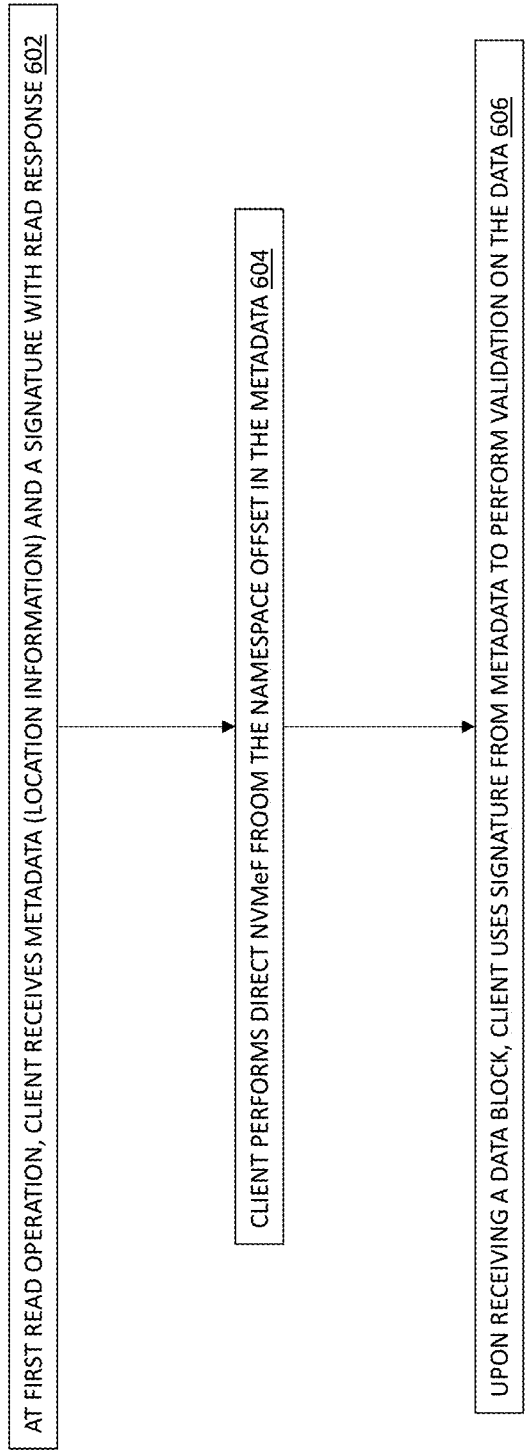
FIG. 6 is a flow diagram describing a process for implementing for implementing host-based read cache for SAN supporting NVMeF with E2E validation.

Turning now to FIG. 6 a process 600 for implementing the embodiments herein will now be described. The process 600 assumes that all drives with user data are accessible to a friendly client via NVMeF with proper namespaces.

In block 602, the first time the client issues a read operation for a data, it will get extra metadata with the read response regarding the data location (e.g., drive number, or namespace, offset on the drive, and the signature. The first time a client issues a read operation, it's considered a regular read operation except that upon this read, other than the data, the client will also receive the metadata (through a new read command, though it is considered a regular read in terms of data flow. Only after this read command is the client able to perform a bypass read/direct read from the NVME drives. The metadata will arrive from the CDR modules (each module has some of the info).

There is a command to get this triplet (e.g., namespace, offset, and signature) for a data block without reading it. As indicated above, the triplet will be received after the first "regular read" operation of this logical address. A new command can be added that will allow the client to get the metadata even without reading the actual data. After reading the metadata, the client can also issue a direct read from the NVME.

In block 604, the client, having the data location information, performs direct NVMeF reads from the namespace offset. This operation completely bypasses the software stack of the storage array and thus has no additional overhead (as fast as the read from the drive). As indicated above, in case data has been moved, the client will get an "invalidate" response and a new location of the data inside of it.

In block 606, after receiving a data block, the client uses the signature to perform E2E validation on the data. This means that an end-to-end validation is performed on the data (i.e., making sure that the data that was read fits the signature on file). This ensures data integrity read from the storage array. The signature can be SHA-1, for example, for CAS-based architectures. In alternative embodiments the signature can be SHA-2 or MURMUR. There is an option to use built-in RDMA/NVMeF capabilities (e.g., T10DIF) to offload these calculations to the fabric itself, so the client will get the data after verification on its own side after transfer.

There is also an option to use vendor specific bypass read commands when reading the block to provide the signature already in the read request. The storage itself may calculate the signature and shift the CPU cycles from the client back to the storage.

The MVMeF enables permissions to be set to only trusted hosts. Each application in the friendly zone will have its own copy of the metadata that allows the application to use "bypass read" using NVMeF. Thus, the embodiments described herein can be scaled to multi-application and multi-cluster environments. Each application does not affect other applications, and cache trashing effects are eliminated. Also, existing bottlenecks on the single metadata path are relieved so many applications can simultaneously read consistent data directly from the drives.

Figure 7:
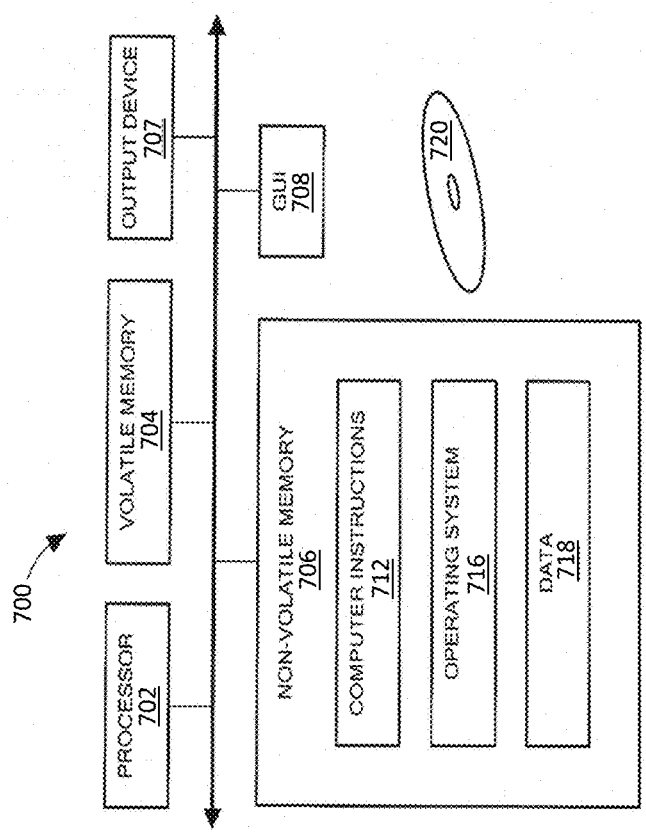
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
providing a shared non-volatile memory express over fabric (NVMeF)/remote direct memory access over converged ethernet (RoCE) space among designated client systems;
upon a first read operation for data from one of the client systems to a storage array, receiving metadata with a read response from the storage array, the read response including the data from the storage array, the metadata including a location of the data based on a drive number associated with a drive, an offset for the data on the drive, and a signature for the data;
performing, by the one of the client systems, a second read operation for the data to the storage array, the second read operation using the metadata to perform a direct non-volatile memory express over fabric (NVMeF) read from the storage array and bypassing a software stack of the storage array; and
upon receiving the data at the one of the client systems, using the signature from the metadata to perform validation on the data;
wherein each of the client systems in the shared NVMeF/RoCE space is provided with its own copy of the metadata that enables the client systems to perform the second read operation bypassing the software stack.

2. The method of claim 1 further comprising issuing a command to access the metadata without reading the metadata.

3. The method of claim 1, further comprising:
upon determining the data has moved, receiving an invalid response and a new location of the data.

4. The method of claim 1, wherein the location of the data is reusable by the one of the client systems over a time period without sending additional requests for the metadata.

5. The method of claim 1, wherein the storage array is implemented in a content addressable storage system, and the first read operation includes an address that is parsed via a routing module and translated via a control module to a hash value of the data and via a data module from the hash value to a physical location of the data on disk.

6. The method of claim 1, wherein the client systems include third-party external providers comprising storage area networks.

7. A non-transitory computer-readable medium having a computer program product stored thereon, the computer program product including instructions that, when executed by a computer causes the computer to perform operations comprising:
providing a shared non-volatile memory express over fabric (NVMeF)/remote direct memory access over converged ethernet (RoCE) space among designated client systems;
upon a first read operation for data from one of the client systems to a storage array, receiving metadata with a read response from the storage array, the read response including the data from the storage array, the metadata including a location of the data based on a drive number associated with a drive, an offset for the data on the drive, and a signature for the data;
performing, by the one of the client systems, a second read operation for the data to the storage array, the second read operation using the metadata to perform a direct NVMeF read from the storage array and bypassing a software stack of the storage array; and
upon receiving the data at the one of the client systems, using the signature from the metadata to perform validation on the data;
wherein each of the client systems in the shared NVMeF/RoCE space is provided with its own copy of the metadata that enables the client systems to perform the second read operation bypassing the software stack.

8. The computer program product of claim 7, wherein the operations further comprise issuing a command to access the metadata without reading the metadata.

9. The computer program product of claim 7, wherein the operations further comprise:
upon determining the data has moved, receiving an invalid response and a new location of the data.

10. The computer program product of claim 7, wherein the signature is one of SHA-1, SHA-2, and MURMUR.

11. The computer program product of claim 7, wherein the location is reusable by the one of the client systems over a time period without sending additional requests for the metadata.

12. The computer program product of claim 7, wherein the data is not subject to a split to different drives.

13. A system, comprising:
a memory comprising computer-executable instructions; and
a processor executing the computer-executable instructions, the computer-executable instructions when executed by the processor cause the processor to perform operations comprising:
providing a shared non-volatile memory express over fabric (NVMeF)/remote direct memory access over converged ethernet (RoCE) space among designated client systems;
upon a first read operation for data from one of the client systems to a storage array, receiving metadata with a read response from the storage array, the read response including the data from the storage array, the metadata including a location of the data based on a drive number associated with a drive, an offset for the data on the drive, and a signature for the data;
performing, by the one of the client systems, a second read operation for the data to the storage array, the second read operation using the metadata to perform a direct NVMeF read from the storage array and bypassing a software stack of the storage array; and
upon receiving the data at the one of the client systems, using the signature from the metadata to perform validation on the data;
wherein each of the client systems in the shared NVMeF/RoCE space is provided with its own copy of the metadata that enables the client systems to perform the second read operation bypassing the software stack.

14. The system of claim 13 further comprising issuing a command to access the metadata without reading the metadata.

15. The system of claim 13, further comprising:
upon determining the data has moved, receiving an invalid response and a new location of the data.

16. The system of claim 13, wherein the signature is one of SHA-1, SHA-2, and MURMUR.

17. The system of claim 13, wherein the location of the data is reusable by the one of the client systems over a time period without sending additional requests for the metadata.

18. The system of claim 13, wherein the data is not subject to a split to different drives.

* * * * *